United States Patent
Wu et al.

(10) Patent No.: US 8,824,470 B2
(45) Date of Patent: Sep. 2, 2014

(54) MULTIPARTY REAL TIME CONTENT DELIVERY

(75) Inventors: Yunnan Wu, Palo Alto, CA (US); Yao Zhao, Oakland, CA (US); Baochun Li, Toronto, CA (US); Minghua Chen, Hong Kong (CN); Jin Li, Bellevue, WA (US); Philip A. Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 12/791,893

(22) Filed: Jun. 2, 2010

(65) Prior Publication Data

US 2011/0299526 A1    Dec. 8, 2011

(51) Int. Cl.
*H04L 12/70* (2013.01)
*H04L 12/18* (2006.01)
*H04L 1/00* (2006.01)
*H04L 12/56* (2006.01)
*H04B 7/155* (2006.01)

(52) U.S. Cl.
CPC .......... *H04L 12/1822* (2013.01); *H04L 1/0076* (2013.01); *H04L 45/48* (2013.01); *H04B 7/15521* (2013.01); *H04L 47/15* (2013.01); *H04L 47/12* (2013.01); *H04L 47/38* (2013.01); *H04L 47/193* (2013.01); *H04L 47/27* (2013.01)
USPC ....................................................... 370/390

(58) Field of Classification Search
CPC . H04L 12/1822; H04L 12/1863; H04L 47/15; H04L 1/0076; H04L 45/00; H04L 45/02; H04L 45/16; H04L 45/48; H04B 7/15521
USPC ........................................................... 370/390
See application file for complete search history.

(56) References Cited

U.S. PATENT DOCUMENTS

| | | | |
|---|---|---|---|
| 6,505,040 B1 | 1/2003 | Kim | |
| 6,778,531 B1 * | 8/2004 | Kodialam et al. | 370/390 |
| 7,212,542 B2 * | 5/2007 | Khawand | 370/464 |
| 7,593,333 B2 * | 9/2009 | Li et al. | 370/232 |
| 7,653,716 B2 * | 1/2010 | Faraj | 709/223 |

(Continued)

OTHER PUBLICATIONS

Honda, et al., "e-MuICS: Multi-Party Conference System with Virtual Space and the Intuitive Input Interface", Retrieved at << http://ieeexplore.ieee.org/stamp/stamp.jsp?tp=&arnumber=1266099 >>, Symposium on Applications and the Internet (SAINT'04), Jan. 26-30, 2004, pp. 8.

(Continued)

*Primary Examiner* — Mark Rinehart
*Assistant Examiner* — Kenneth P Hunt
(74) *Attorney, Agent, or Firm* — Steve Wight; David Andrews; Micky Minhas

(57) ABSTRACT

Described is a distributed peer-assisted multicast content delivery system (e.g., a multiparty conferencing application) that uses an adaptive link rate control protocol to discover and adapt to an arbitrary topology quickly and converge to efficient link rate allocations allowed by an underlying network. Link rates are regularly obtained and used to determine trees for sending packets to other nodes. Network coding is used to implement data multicast so that mixtures (i.e., linear combinations) of the packets are transmitted in the network. The redundant packets may be differentiated from non-redundant ("innovative") packets such that network conditions may be measured by link innovation and/or session innovation.

20 Claims, 9 Drawing Sheets

(56) References Cited

U.S. PATENT DOCUMENTS

| | | | |
|---|---|---|---|
| 7,660,301 B2* | 2/2010 | Bush | 370/389 |
| 8,098,611 B2* | 1/2012 | Zhang et al. | 370/315 |
| 8,214,526 B2* | 7/2012 | Wu et al. | 709/238 |
| 2006/0007947 A1* | 1/2006 | Li et al. | 370/432 |
| 2007/0280255 A1* | 12/2007 | Tsang et al. | 370/395.2 |
| 2008/0089333 A1* | 4/2008 | Kozat et al. | 370/390 |
| 2008/0291834 A1* | 11/2008 | Chou et al. | 370/238 |
| 2009/0015659 A1 | 1/2009 | Choi | |
| 2009/0323580 A1* | 12/2009 | Xue et al. | 370/315 |
| 2011/0299526 A1* | 12/2011 | Wu et al. | 370/390 |
| 2012/0182860 A1* | 7/2012 | Liu et al. | 370/216 |

OTHER PUBLICATIONS

Bhattacharyya, et al., "Efficient Rate-Controlled Bulk Data Transfer using Multiple Multicast Groups", Retrieved at << http://citeseerx.ist.psu.edu/viewdoc/download;jsessionid=153F3BF91B6660DF61E6B34F16D31BF4?doi=10.1.1.52.5743&rep=rep1&type=ps >>, IEEE/ACM Transactions on Networking (TON), vol. 11, No. 6, Dec. 1, 2003, pp. 895-907.

Kim, et al., "A NETwork COding based Multicasting (NETCOM) over IEEE 802.11 Multi-hop", Retrieved at << http://ieeexplore.ieee.org/stamp/stamp.jsp?tp=&arnumber=4212611 >>, Proceedings of the 65th IEEE Vehicular Technology Conference, VTC, Apr. 22-25, 2007, pp. 845-848.

Chen, et al., "Optimization Based Rate Control for Multicast with Network Coding", Retrieved at << www.its.caltech.edu/~tho/Netcod-info07.pdf >>, IEEE Infocom, 2007, pp. 9.

Park, et al., "Codecast: A Network-Coding-Based Ad Hoc Multicast Protocol", Retrieved at << http://nrlweb.cs.ucla.edu/publication/download/399/getPDF.pdf >>, IEEE Wireless Communications, Oct. 2006, pp. 76-81.

Gu, et al., "Peer Talk: A Peer-to-Peer Multiparty Voice-over-IP System", Retrieved at << http://ieeexplore.ieee.org/stamp/stamp.jsp?tp=&arnumber=4359446 >>, IEEE Transactions on Parallel and Distributed Systems, vol. 19, No. 4, Apr. 2008, pp. 515-528.

Li, et al., "Mutualcast: An Efficient Mechanism for Content Distribution in a p2p Network", Retrieved at << ftp://ftp.research.microsoft.com/pub/tr/TR-2004-100.pdf >>, 2004, pp. 9.

Chen, et al., "Utility Maximization in Peer-to-peer Systems", Retrieved at << http://home.ie.cuhk.edu.hk/~mhchen/papers/p2p.utility.sigmatrics.08.pdf >>, Proceeding of ACM SIGMETRICS, Jun. 2-6, 2008, pp. 13.

Ahlswede, et al., "Network Information Flow", Retrieved at << http://pdos.csail.mit.edu/decouto/papers/ahlswede00.pdf >>, Information Theory, IEEE Transactions on in Information Theory, IEEE Transactions on, vol. 46, No. 4, Aug. 6, 2002, pp. 1204-1216.

Chou, et al., "Practical Network Coding", Retrieved at << http://research.microsoft.com/apps/pubs/default.aspx?id=78167 >>, Allerton Conference on Communication, Control and Computing, Oct. 2003, pp. 10.

Gkantsidis, et al., "Network Coding for Large Scale Content Distribution", Retrieved at << http://www.eecs.harvard.edu/~michaelm/CS222/contentdist.pdf >>, Proceedings IEEE 24th Annual Joint Conference of the IEEE Computer and Communications Societies (2005), vol. 4, 2005, pp. 1-11.

Wang, et al., "R2: Random Push with Random Network Coding in Live Peer-to-Peer Streaming", Retrieved at << http://www.eecg.toronto.edu/~bli/papers/mwang-jsac07.pdf >>, IEEE Journal on Selected Areas in Communications, vol. 25, No. 9, Dec. 2007, pp. 11.

Wu, Yunnan., "A Trellis Connectivity Analysis of Random Linear Network Coding with Buffering", Retrieved at << http://ieeexplore.ieee.org/Xplore/login.jsp?url=http%3A%2F%2Fieeexplore.ieee.org%2Fie15%2F4035458%2F4035896 >>, IEEE International Symposium on Information Theory, Jul. 9-14, 2006, pp. 768-772.

Wu, et al., "Distributed Utility Maximization for Network Coding Based Multicasting: A Critical Cut Approach", Retrieved at << http://www.princeton.edu/~chiangm/codingutility.pdf >>, 4th International Symposium on Modeling and Optimization in Mobile, Ad Hoc and Wireless Networks, Apr. 3-6, 2006, pp. 1-11.

Wu, et al., "A Unification of Network Coding and Tree-Packing (Routing) Theorems", Retrieved at << http://www.cs.ust.hk/mjg_lib/Library/WuJK2006.pdf >>, IEEE/ACM Transactions on Networking (TON), Special issue on networking and information theory, vol. 14, No. SI, Jun. 2006, pp. 1-13.

* cited by examiner

MULTIPARTY REAL TIME CONTENT DELIVERY

BACKGROUND

Content delivery systems, such as for multimedia conferencing applications, allow two or more remote parties (e.g., individuals or co-located groups of people) to see each other as well as speak to each other over a network such as the Internet. In a typical multimedia conferencing scenario, every party wants to view audio/video from all other parties and is a source of its own audio/video stream. Because of the substantial time and cost savings provided by multimedia conferencing, the use of such technology has significantly grown and will continue to grow in popularity.

One typical multimedia conferencing technology employs a centralized multipoint control unit (MCU) that receives an audio/video stream from each participant and distributes the streams to each other participant. However, an MCU is expensive, and needs to be able to handle a high load. Further, MCUs are relatively limited, in that they are not very scalable as the number of parties increases.

A multimedia conferencing technology that does not need to use an MCU is based on peer communication, e.g., where each source transmits to every other party, sometimes referred to as simulcast. However, as the group size increases, video quality deteriorates due to peer uplink bandwidth constraints.

Tree-based multiparty conferencing is another solution, in which peers assist in forwarding packets to others over multicast trees; an MCU is not required, but can assist in forwarding packets. In general, the nodes form trees of links, (e.g., three multiparty conferencing nodes form nine depth one and depth two trees, with one depth one tree per source node and two depth two tree per source node, where depth one has no forwarding node, and depth two has one forwarding node), and the source node adjusts the tree rates in response to queuing delays. While peer-assisted multicasting provides benefits over other technologies, there are a number of drawbacks with this solution, including that a full mesh between parties is assumed, however some of the links of the full mesh may break down in practice. Further, there is no redundancy, whereby a packet lost in a tree means that the downstream receiver cannot get an event trigger to forward a packet. There are other drawbacks as well, e.g., the set of possible trees have a fixed structure that may not be optimized for the underlying network constraints, there is a fan-out delay, which increases for large party multiparty conferencing, and so forth.

What is needed for multiparty conferencing is a peer-assisted real-time transport solution that works well under arbitrary network conditions and provides desirable quality of service (QoS), even under varying network dynamics.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which content is delivered to nodes in packets over a tree and/or by network coding that are based upon measured network conditions. Measured network conditions are used to regularly compute link rate information. Based upon the link rate information, a tree of links (which may be the same tree or a new tree) for transmitting tree-communicated packets is regularly determined. Coded packets may be mixed for transmitting to other nodes using network coding. The tree-communicated packets are transmitted to other nodes for receipt and forwarding according to the tree. Any network coded packets are also transmitted over one or more links.

In one aspect, information corresponding to redundant packets and non-redundant ("innovative") packets is maintained. This information may be used in determining network conditions, and thus in computing the link rate information. The redundancy information may be maintained per link (link innovation) and/or per session (session innovation).

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a peer-assisted multicast content distribution technology that does not require a central server (but may have server assistance), and has low end-to-end delay. The technology is also robust to network dynamics such as packet losses and jitter, and can discover the network capabilities and deliver audio and video content at quality levels commensurate with the available network resources. In one aspect, there is provided an adaptive link rate control protocol that can quickly discover and adapt to an arbitrary topology and converge to efficient link rate allocations allowed by the underlying network. In one aspect, network coding is used to implement data multicast so that mixtures (e.g., linear combinations) of the audio and video packets are transmitted in the network. Network coding provides resilience to network dynamics (including redundancy against packet loss) and improves the diversity in the information flow.

It should be understood that any of the examples herein are non-limiting. For example, one content delivery system is described using a multiparty conferencing application/audiovisual data as an example; however other applications, such as gaming (where participants speak and exchange data) may leverage the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in data communication in general.

Figure 1:
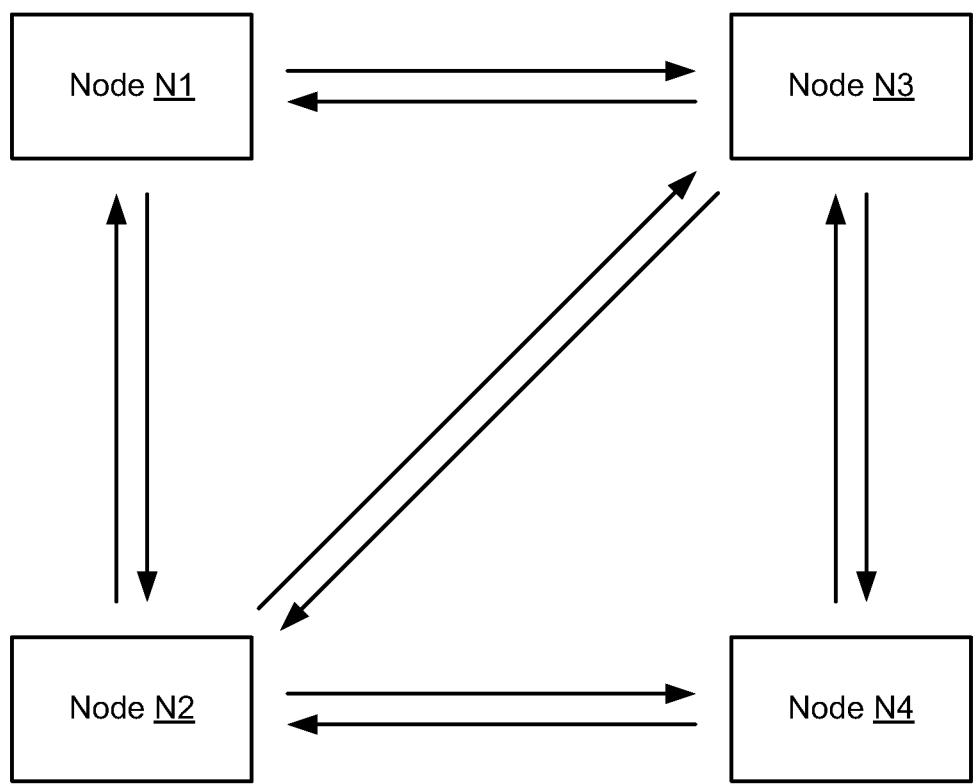
FIG. 1 is a block diagram representing example nodes communicating content in a peer-assisted multicast environment.

FIG. 1 shows an example of four nodes N1-N4 in a content delivery system, in which each node sends and receives data such as audiovisual (audio and/or video) data to and from each other node, possibly along with other data such as document collaboration data, game-related data, and so forth. In FIG. 1 there are overlay links between each node and each other node, except that in this example there are no links between the node N1 and the node N4. Thus, packets from the node N1 to N4 (and vice-versa) need to be forwarded by the node N2 and/or the node N3 over two or more links. As will be understood, a full mesh between nodes is not needed.

Figure 2:
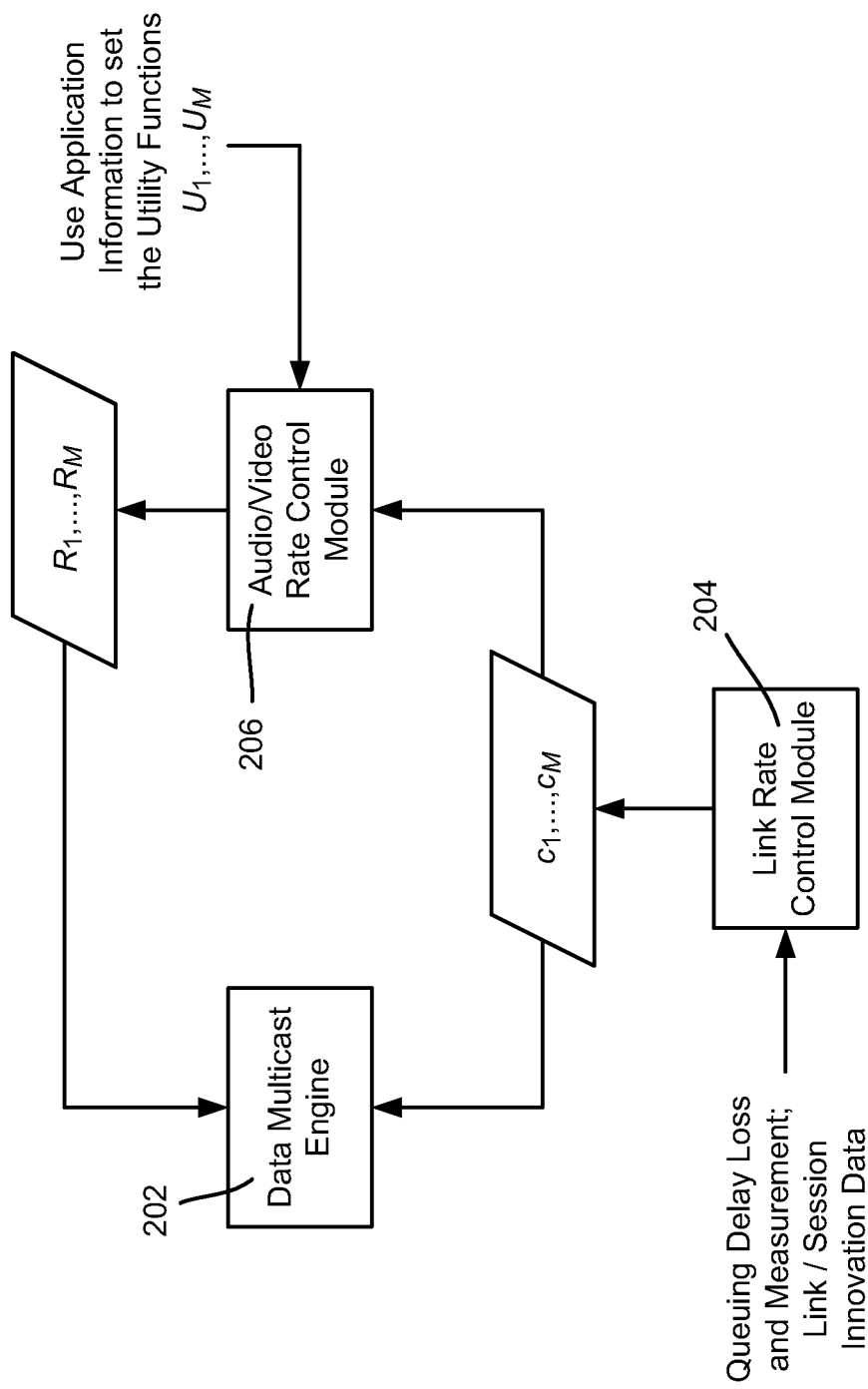
FIG. 2 is a block diagram representing example components of a node configured for multiparty conferencing.

FIG. 2 shows an example architecture of the components in each node, including a data multicast engine 202, link rate control module 204, and audio/video rate control module 206. In general, the data multicast engine 202 is responsible for the actual data transfer in the system, which in one implementation makes use of trees and (possibly) network coding as described below. The data multicast engine 202 takes the link rates, denoted by c ($c_1, \ldots, c_M$) in FIG. 2, as its input as provided by the link rate control module, and sends the packets at rates according to c.

In an audiovisual application, the audio/video rate control module 206 may dynamically control the source audio/video encoding rates, denoted by R ($R_1, \ldots, R_M$) in FIG. 2. This is performed to present the best quality that is supportable by the underlying network and to deliver a smooth user experience, despite uncontrollable dynamics. For example, one possible source rate control rule is to set the source rate to some estimate (e.g., eighty percent) of the achievable throughput within a delay bound. This estimate can be replaced by a value that is computed from the dynamics in the system (e.g., packet loss rate). Another approach is to use some percentage (e.g., eighty percent) of the received rank within the latency bound. Yet another approach is to set the source rate such that when any node leaves the system, such a rate can still be supported by the system. When a node just leaves, the audio/video source rate control and the data multicast engine have one less node to communicate with. When a node joins, $R_m(c_m)$ (where $R_m(c_m)$ denotes the stream rate as described below) will suddenly drop to a low value and it will grow slowly from there. However, before the new node receives enough flow (e.g., for five seconds), the audio/video source rate control and the actual data multicast engine treat the new node as a helper.

The link rate control module 204 controls the link bit-rates via an adaptive control algorithm. In general, based upon network conditions, the link rate control module 204 may increase or decrease the bit-rates on any or all of the links between any two nodes shown in FIG. 1; link rates are generally different for regular packets which are sent via trees, versus network coded packets, as described below. Note that this differs from the prior-tree based solution where rates are controllable only per tree, and network coding was not used. Instead, each link may be allocated a rate, with a tree then determined from the link allocations. Not all of the available rate may be allocated to trees, e.g., only ninety percent, so that resources are available for use in sending coded packets.

The adaptive control algorithm is distributed to each node, that is, each node has a link rate control module 204 for controlling the current link rate allocation. The measured network conditions may include the queuing delay (round-trip-time or one-way delay) and/or packet loss measurement on the links, e.g., using known measurement techniques. Thus, if congestion is detected on a link, then the link rate will be decreased. However, the rates of adjustment for the links may be coordinated among the nodes. In this manner, the adaptive link rate control protocol discovers and adapts to arbitrary topology quickly and converges to efficient link rate allocations allowed by the underlying network. An example time that the rates are controlled are every 50 ms or the round-trip-time, whichever is longer, or if the arrival of a new packet results in the detection of a new loss event.

In the example of FIG. 2, consider that there are M (audio/video) multicast streams. Each stream has a source node that generates the content and a set of sink nodes that subscribes to the stream. Let $c_m$ denote the vector of overlay link rates allocated to stream m. These link rates $c_1, \ldots, c_M$ are adaptively controlled in response to network congestion conditions, such as using a network utility maximization formulation as described below. To this end, in one embodiment each node measures queuing delay and loss on its incoming links and sends back the measurement results to the source nodes. Using these congestion signals, each source node $s_m$ adjusts the rate allocation vector $c_m$ according to an update equation; (an example update equation is described below).

Other alternatives are feasible. For example, in a centralized critical cut computation implementation, each source may receive reports from each peer and compute the rates; however, in a distributed critical cut computation implementation, peers can update the rates and request the other peers to change the rate.

Moreover, as described below, network coding provides some redundant packets among the non-redundant ("innovative") packets; the amount of innovation may be used in determining the rates. More particularly, link innovation essentially determines the percentage of which packets are useful (innovative) of the total of those packets received on a link. Session innovation essentially determines the percentage of which packets are useful (innovative) of the total of those packets received on all links for a given session, (where session refers to the packets sent over a given tree configuration, which changes as the rates adapt).

Link rate adaptation may thus be driven by session and/or link innovation measurements. As described below, link rate adaptation may instead (or additionally) be driven by link states and distributed critical cut computations, or link states and centralized critical cut computations.

In one implementation, based on these rates, each node forms a number of distribution trees, and assigns the trees to the source coded packets; the output packet contains the tree structure and a timestamp. Each source node also may perform coding over the source packets. In one implementation, the data multicast engine 202 performs these operations.

With respect to tree formation, the data multicast engine 202 receives the link rates from the module 204 and determines a tree for sending packets to other nodes; (note that the packets sent via a tree are not the coded packets). For example, every 300 ms, each node sends a link-state report of its incoming links for each session to the session source; the rate reported on each link is the sustainable rate (e.g., the ninetieth percentile of achieved rates in the past second). Upon receiving the link-state report, the source updates its link-state graph, and every one second, for example, the source "repacks" the trees to determine a tree to use for a session.

In order to determine which of the possible candidate trees to use, in one implementation the data multicast engine 202 performs one of two operations depending on the number of nodes. If the number of nodes is relatively small, such as less than or equal to six (below a threshold of seven), then the data multicast engine 202 enumerates all possible depth-one and depth-two candidate trees ("packs" them based upon the rates while maximizing delay-limited capacity of the remaining resource) to select a tree to use, as described below. One formula for delay-limited capacity is:

$$R(c) = \min_{t \in T} \sum_{i:delay(s \to i \to t) < D} \min\{c_{s,i}, c_{it}\}$$

If the number of nodes achieves the threshold, e.g., is seven or greater, then the number of candidate trees becomes less manageable, and every candidate tree is not enumerated for practical reasons. Instead, each tree is packed by adding edges (links) one by one from candidate edges; the edge that is chosen is the one that maximizes delay-limited capacity.

The receipt of a packet triggers the transmission of one packet on each branch of the tree (as given in the packet header, described below with reference to FIG. 4). As described below, the node receiving this packet may mix (using network coding on) the packet with other received packets, possibly according to some rules, e.g., one possible rule is to allow a packet to be mixed only with packets having an earlier timestamp.

Figure 3:
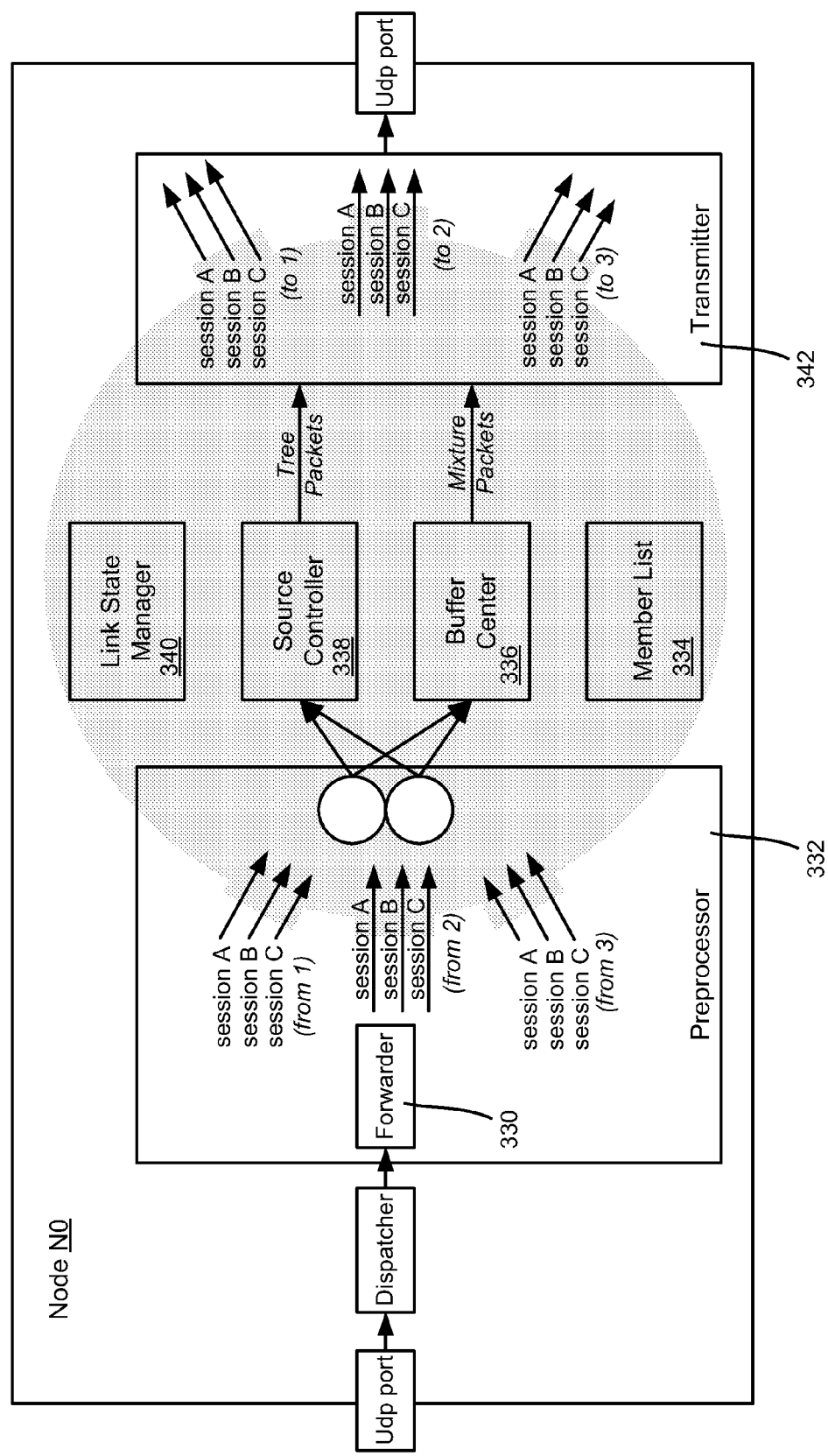
FIG. 3 is a block diagram representing example components of a node from a software perspective for receiving and sending packets, including coded packets.

FIG. 3 shows an example node in which packets are received at a node N0 from senders 1-3, and sessions A-C, via a udp port and dispatcher. A forwarder 330 determines whether and how to forward the packet, e.g., as a tree packet for coding, and/or a coded packet. It is appreciated that tree packets and coded packets are of different packet types. The preprocessor 332 maintains various statistics for the sessions and links, e.g., loss rate, bit rate, session and link innovation statistics, and so forth.

The member list module 334 maintains a list of parties participating in the content distribution scheme, e.g., their IP addresses. The buffer center 336 buffers the received packets, including for coding (mixing), as described below. The source controller 338 packs the tree and generates the tree packets for sending. The link state manager 340 receives the reports (graphs) regarding the link state information from the other nodes, and sends the report from this node. The tree packets and mixture packets are sent by the transmitter 342 as appropriate for the various sessions and links.

Figure 4:
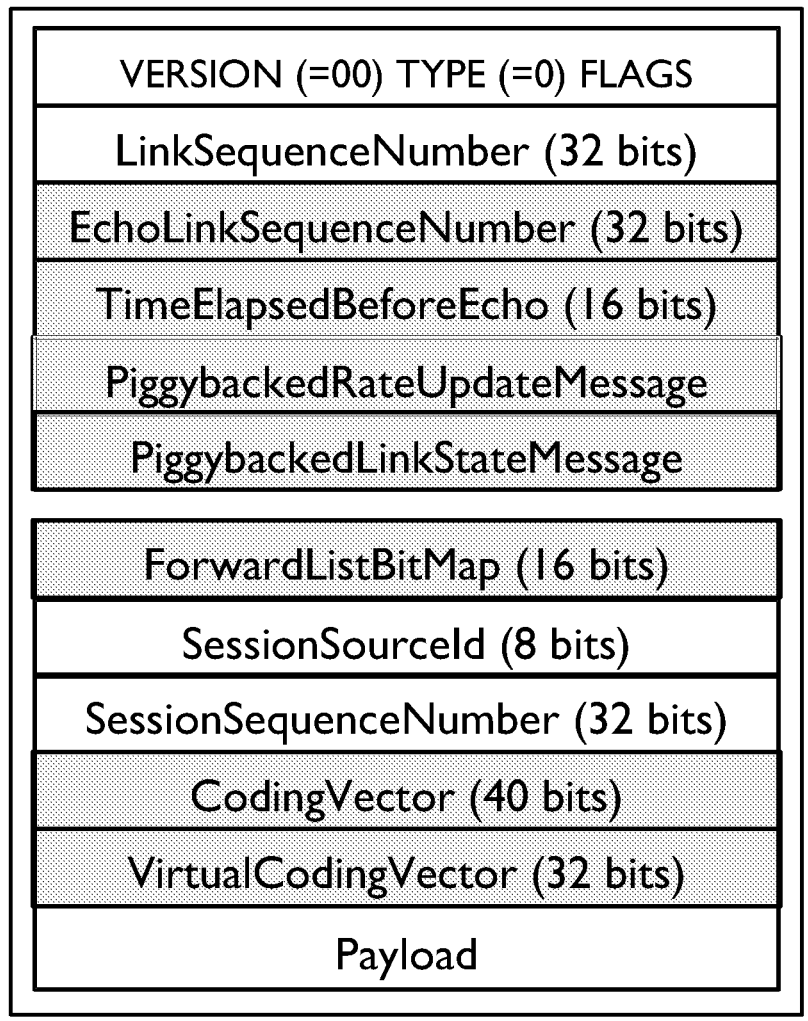
FIG. 4 is a representation of an example format of a data packet for content delivery, including header information for forwarding packets over trees or for coded packets.

FIG. 4 is a representation of a data packet structure used in one implementation, with the flags providing information as to which fields are present. Flags are included for the echo-related fields, rate update field, link state field, forward list field and coding vector fields, shown shaded in gray, respectively. For a tree packet, the maximum header is eighteen bytes in length, while for a coded packet, the maximum header is twenty-five bytes.

Figure 5:
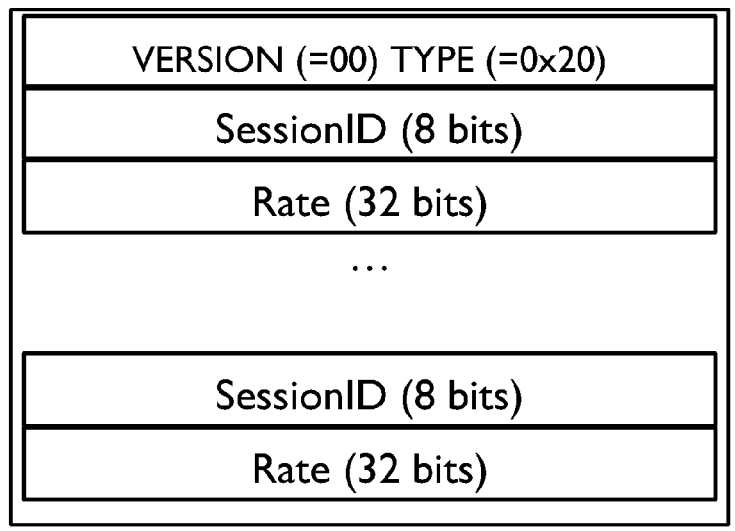
FIG. 5 is a representation of an example format of a rate update packet for sending rate-related information to other nodes.
Figure 6:
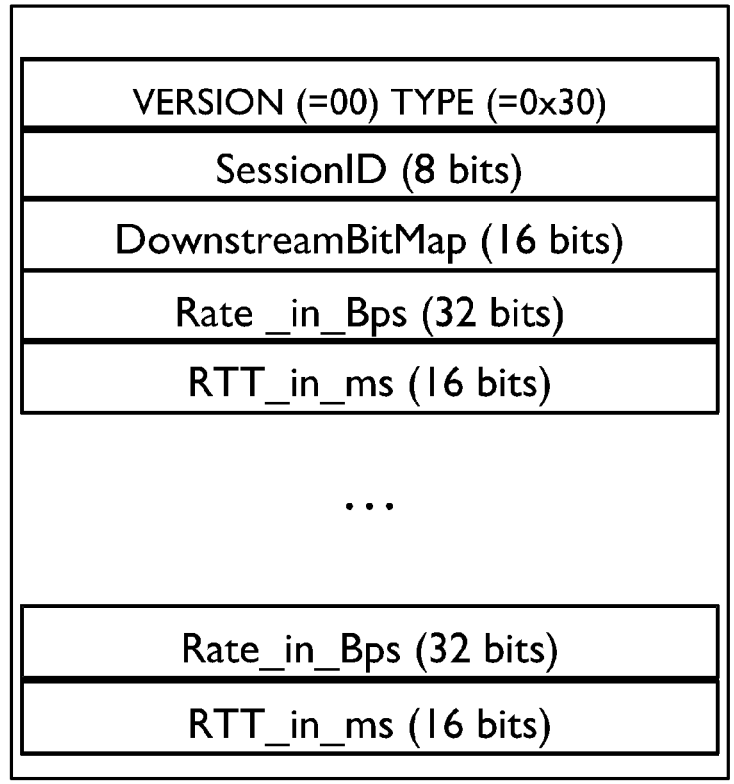
FIG. 6 is a representation of an example format of a link state packet for sending link-related information to other nodes.

FIG. 5 shows an example format for a rate update packet, with a rate value for each session. FIG. 6 shows an example format for a link state packet format that provides the information for a link, including session, downstream data, rate and round trip data.

Turning to additional details, there are usually a number of audio/video streams in multiparty conferencing applications, in which each stream is generated at a source node and needs to be delivered to a set of nodes that subscribe to the stream. The task of a communication layer is to maximize the quality of service (QoS) of these application streams by running certain data transport mechanisms over the overlay links. To this end, the network capabilities need to be discovered so as to efficiently utilize the available network resources to support the application streams. One objective is the proper allocation of overlay link rates to the streams. Such an objective may be modeled as a network utility maximization problem:

$$\text{maximize} \sum_{m=1}^{M} U_m(R_m(c_m)) \tag{1}$$

$$\text{subject to: } a_l^T(c_1 + \ldots + c_M) \leq C_l, \forall l \in \mathcal{L}, \tag{2}$$

$$c_m \geq 0, m = 1, \ldots, M. \tag{3}$$

The variables in the above optimization are $c_1, \ldots, c_M$, where $c_m$ is the vector of overlay link rates allocated to stream m (with one entry for each overlay link). The objective of this optimization is to maximize the sum utility for the streams, where $R_m(c_m)$ denotes the stream rate that can be supported using resource $c_m$ within the given delay bound and $U_m(R_m)$ is an increasing and concave function that maps the stream rate to an application utility.

The constraints of this optimization correspond to the network resource constraints. Here $\mathcal{L}$ denotes the set of needed resources (e.g., a link in the underlay), $C_l$ denotes the capacity of resource l, and $a_l^T$ c describes the load on resource l incurred by overlay traffic c. For example, if the underlying network is constrained by total ingress and egress capacities, then the network constraints have the following form:

$$\sum_j c_{ij} \leq C_i^{(out)}, \forall i$$

$$\sum_j c_{ji} \leq C_i^{(in)}, \forall i,$$

where $$c_{ij} \triangleq \sum_{m=1}^{M} c_{ij}^{(m)}$$

denotes the total bit-rate of overlay link ij used by the M streams. As another example, consider a branch office scenario (a single link connects the parties at one branch with the parties at a remote branch) where the branch office has leased some bandwidth for the total incoming and outgoing links. In this case, the network constraints can have the following form:

$$c_{13}+c_{14}+c_{23}+c_{24} \leq C_l^{(out)},$$

$$c_{31}+c_{32}+c_{41}+c_{42} \leq C_l^{(in)},$$

$$c_{13}+c_{14}+c_{23}+c_{24} \leq C_{II}^{(in)},$$

$$c_{31}+c_{32}+c_{41}+c_{42} \leq C_{II}^{(out)}.$$

$R_m(c_m)$ is a concave function, and thus the network utility maximization formulation of equations (1)-(3) is a convex optimization problem. In principle, one possible approach is to first infer the network constraints and then solve the optimization centrally. However, directly inferring the constraints potentially requires knowledge about the underlay topology and is highly challenging.

As described herein, instead of trying to learn the resource constraints directly, adaptive control techniques are used for network utility maximization problems. These can be viewed as iterative algorithms for solving an approximate version of the problem given in equations (1)-(3).

Consider a potential function:

$$V(c_1, \ldots, c_M) \triangleq \sum_{m=1}^{M} U_m(R_m(c_m)) - P(c_1 + \ldots + c_M) \quad (4)$$

$$P(c) \triangleq \sum_{l \in \mathcal{L}} \int_0^{a_l^T c} \frac{(y-C_l)^+}{y} dy, \quad (5)$$

where $(c)^+=\max\{c,0\}$. The second term in the potential function is a penalty function for the resource constraints. If the constraints are satisfied, then the second term evaluates to zero; if instead some constraints are violated, then some penalty is charged for doing so. The process seeks to maximize $V(c_1, \ldots, c_M)$ as an approximation of the original constrained optimization problem.

It can be shown that $V(c_1, \ldots, c_M)$ is concave. If V is differentiable, then the maximization of V can be solved via a gradient ascent algorithm. Specifically, let the link rates be controlled by the following differential equation:

$$c_m^{\cdot}=K_m[U'_m(R_m(c_m))\nabla R_m - \nabla P], \quad (6)$$

where $K_m$ is a diagonal matrix with positive entries that act as scaling coefficients. It can be shown that such adaptive control will converge to a maxima of V. Note that in equation (6), the update of $c_m$ can be carried out independently of the updates of other link rates; this is due to the additive structure in the utility function.

The e-th entry of $\nabla P$ basically can be interpreted as the packet loss rate observed at overlay link e. Let $c=c_1+\ldots+c_M$. The e-th entry of $\nabla P$ is:

$$\sum_{l \in \mathcal{L}} a_{l,e} \frac{(a_l^T c - C_l)^+}{a_l^T c}. \quad (7)$$

The term $(a_l^T c - C_l)^+$ is the excess traffic rate offered to resource l; thus $$\frac{(a_l^T c - C_l)^+}{a_l^T c}$$

models the fraction of traffic that is dropped at resource l. The overlay link e induces a traffic of $a_{l,e}c_e$ at resource l. Assuming the packet loss rates are additive (which is a reasonable assumption for low packet loss rates), the total packet loss rates seen at link e is thus given by equation (7). Let l denote the vector of measured packet loss rates at the overlay links. Based on this justification, the term $\nabla P$ may be replaced in the control equation (6) by the packet loss rates l. Therefore, the control algorithm becomes:

$$c_m^{\cdot}=K_m[U'_m(R_m(c_m))\nabla R_m - l]. \quad (8)$$

In the case that the function $R_m$ is not differentiable, subgradient update algorithms may be used instead of gradient updates. More particularly, $\nabla R_m$ may be replaced by a subgradient of $R_m$, denoted by $\partial R_m$. A subgradient is a generalization of the gradient to non-differentiable functions; for a concave function f(x), each subgradient at x corresponds to a linear over-estimator of f that touches f at x. The known subgradient method maximizes a non-differentiable concave function in a way similar to gradient methods for differentiable functions, namely in each step, the variables are updated in the direction of a subgradient. However, such a direction may not be an ascent direction; instead, the subgradient method relies on a different property. If the variable takes a sufficiently small step along the direction of a subgradient, then the new point is closer to the set of optimal solutions.

An alternative approach to the network utility maximization approach uses a primal-dual control method. With primal-dual algorithms, the update has the following form:

$$c_m^{\cdot}=K_m[U'_m(R_m(c_m))\partial R_m - q]. \quad (9)$$

where q is the vector of queuing delays measured at the links. Queuing delay represents another congestion measure. For example, TCP-Vegas is a version of TCP that reacts to queuing delay; if the queuing delay is large, the window size is decreased; otherwise, the window size is increased.

For TCP congestion control algorithms, another version, TCP-Illinois, combines queuing delay and packet loss as congestion signals. More particularly, packet loss is used to decide the direction of window size adaptation, that is, upon encountering a packet loss, the window size is decreased; otherwise, the window size is increased. The queuing delay is used to control the amount the window size is adjusted.

Similar to TCP-Illinois, one implementation makes use of both packet loss and queuing delay as congestion signals. The modified update has the following form:

$$c_m^{\cdot}=K_m[U'_m(R_m(c_m))\partial R_m - l - \alpha q]. \quad (10)$$

where $\alpha$ is a weighting factor. This hybrid approach has been empirically seen to offer a better performance.

In one system implementation, each node measures queuing delay and loss on its incoming links and sends back the measurement results to the source nodes. Each source node $s_m$ centrally performs the control according to the update equation:

$$c_m^{\cdot}=K_m[U'_m(R_m(c_m))\partial R_m - l - \alpha q]. \quad (11)$$

Thus, the link rates allocated to each stream are updated via an adaptive control algorithm, and it is assumed that the system knows the bit-rates that can be used on each link. More particularly, consider the m-th stream, which originates at source node $s_m$ and needs to be delivered to a set of sink nodes $T_m$. Let $c_m$ be the allocated link rates that can be used for the m-th stream. In general, a goal is to maximize the multicast throughput that can be supported within the delay bound. In addition, according to the link rate control, the achievable throughput $R_m(c_m)$ needs to be characterized to compute a subgradient of it.

Figure 7:
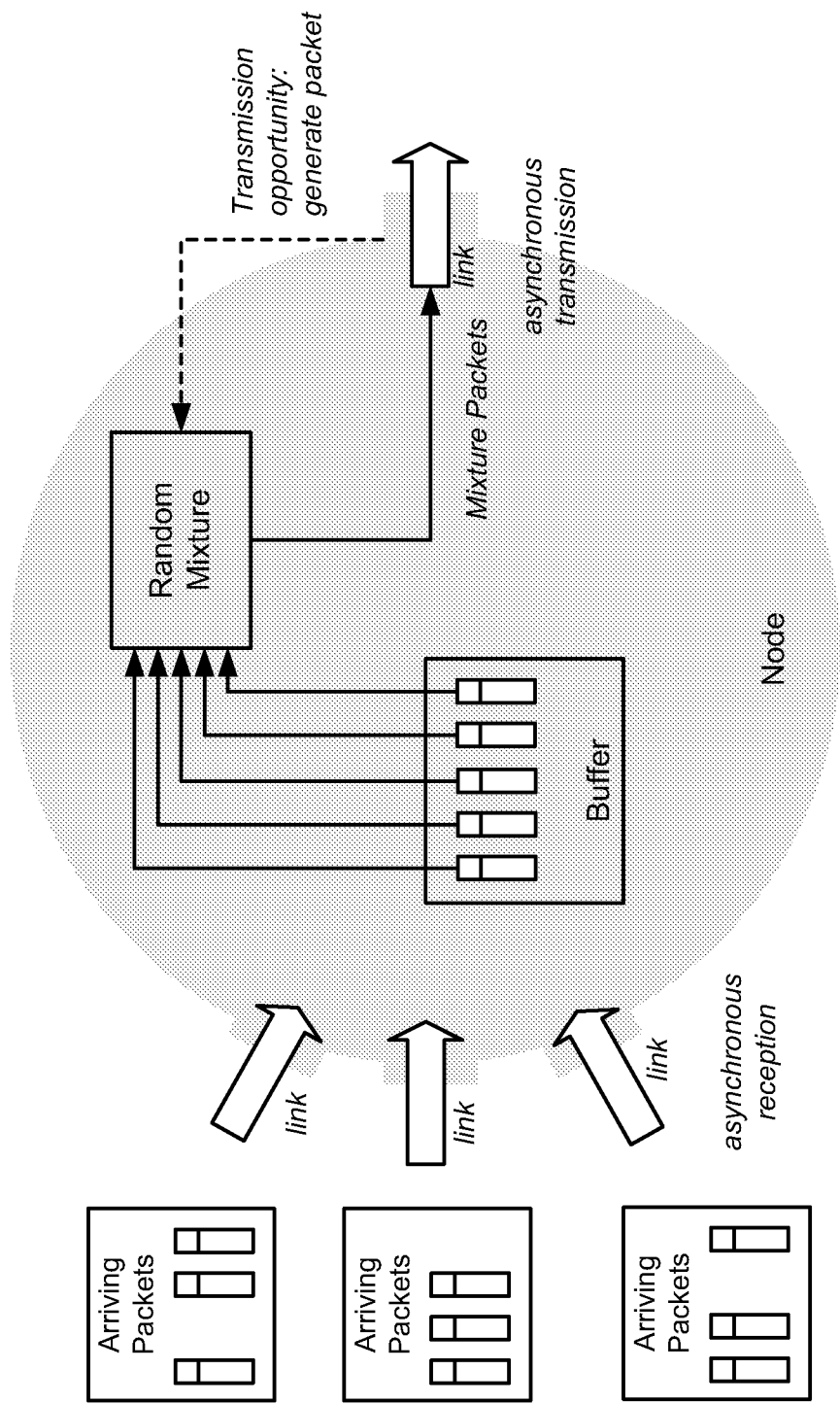
FIG. 7 is a representation of network coding that mixes received packets within a node for transmission as network coded packets.

Turning to various aspects of network coding, FIG. 7 shows the concept of mixing received (buffered) packets and encoding them as linear combinations, from which a lost original packet may be recreated; (e.g., packets A and B may be combined into 3A+2B, and if packet A is lost, it may be recreated from packet B and the mixed 3A+2B packet). In other words, network coding generalizes the store-and-forwarding by allowing information to be "mixed" at a node, that is, a node can output packets that are linear combinations of input packets as generally described in published U.S. patent application no. 20070274324. Network coding provides resilience to network dynamics and improves the diversity in the information flow. Not only does network coding provide for resiliency, but also network coding helps in figuring out the network capabilities, e.g., the link innovation and session innovation aspects are related to packet redundancy measurements, wherein the redundancy is provided via network coding.

As described above, network coding may be performed in the data multicast engine. Conventional approaches for network transfer in packet networks are based on store-and-forwarding. In the case of multicast communications, the prevailing approach is to use one or more multicast trees to deliver information. Network coding generalizes the store-and-forwarding by allowing information to be "mixed" at a node, whereby a node can output packets that are linear combinations of the input packets. As described herein, sending mixture packets offers many advantages, such as higher throughput, better robustness, better diversity, and so forth. Note that when packing trees in an implementation that also uses network coding, some resources (e.g., ten percent of a link) are reserved for communicating the network coded packets.

Figure 8:
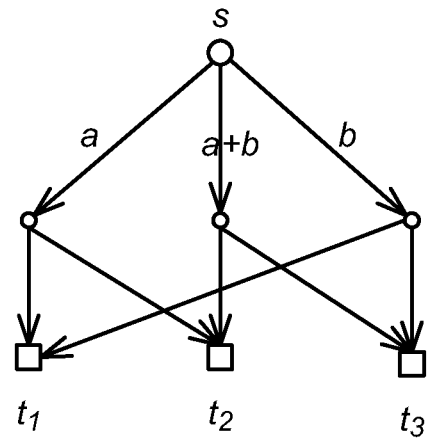
FIG. 8 is a representation of a multicast scenario in which a source node multicasts information to receiver nodes.

A result of network coding is that in a network of given link capacities, the maximum possible throughput for information multicast from a source node s to a set of receivers is given by the minimum cut capacity separating the source from a receiver, and such throughput can be achieved by performing network coding at the nodes. By way of example, consider the multicasting scenario in FIG. 8, where a single source s is multicasting information to three receivers, $t_1$, $t_2$, $t_3$. Suppose the capacity of each link is 100 Kbps. Then the minimum cut capacity is 200 Kbps. Note that it is impossible to achieve a rate of 200 Kbps by store-and-forwarding. In contrast, network coding can achieve the maximum throughput of 200 Kbps.

A known theory maintains that network coding can achieve the maximum throughput; significant progress has been made towards practically achieving the maximum multicast throughput. For example, it has been demonstrated that in a practical packet network of given link capacities, a network coding-based approach can achieve close to the maximum possible throughput.

More particularly, in this scheme, each node maintains a buffer, which stores the received packets. Periodically, at the prescribed rate on each outgoing link, a node generates a packet that is a random linear combination of the packets in the buffer. The example in FIG. 8 demonstrates the throughput gain offered by network coding. In addition to potential throughput gains, network coding can offer other advantages. Network coding, as a generalized form of erasure resilient coding, provides built-in robustness against packet losses. Therefore, a network coding-based solution automatically takes care of the packet loss. Moreover, network coding increases the diversity in the information flow. In a network coding-based system, each node simply produces random linear mixture packets. The overall effect is as if the information packets can self-orchestrate multiple paths towards the destinations.

Figure 9:
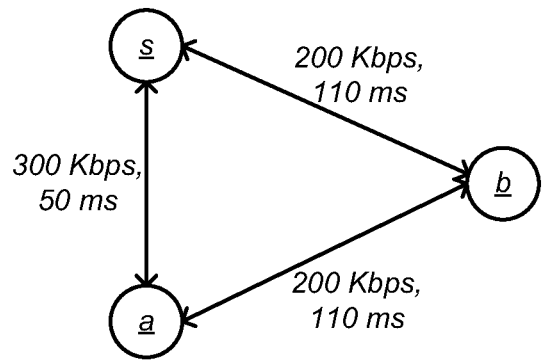
FIG. 9 is representation of example illustrating resource limitations in a network.

Compared with previous applications of network coding, network coding for real-time conferencing has some distinct features, due to the real time needs of a real-time conferencing application. Considering the delay requirement, the maximum possible throughput may not be the minimum cut in the network. This is illustrated by the example in FIG. 9. In FIG. 9, there is a source node s and two receiver nodes, a and b. Shown on each link are its capacity and delay (minimum time to send a packet over the link). Suppose the delay requirement is 200 ms for the conferencing application. The min-cut in this case is min{300+200, 200+200}=400 (Kbps). However, it cannot be achieved within the delay bound.

Figure 10:
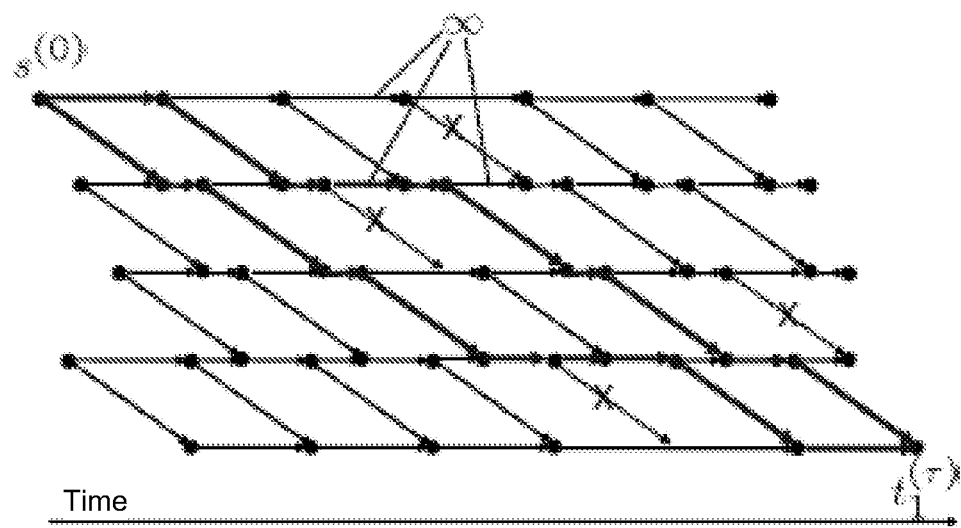
FIG. 10 is representation of a continuous-time trellis for modeling information flow in a packet network.

Thus, "latency-limited throughput" for conferencing applications needs to be examined since the propagation delay and per-packet handling delay is on the same order as the total delay bound. To model the latency-limited throughput with network coding, assume that at discrete instants, new source contents are injected into the network. For example, each video frame may generate a certain number of packets. The information flow in a packet network can be modeled by a continuous-time trellis, which is illustrated by FIG. 10.

A continuous-time trellis has two types of edges, namely transmission edges and memory edges. Each transmission edge models a physical packet transmission. Suppose a packet is sent from node u at time $\tau_0$ and it is successfully received by node v at time $\tau_1$. To model such a transmission, nodes $u^{(\tau_0)}$ and $v^{(\tau_1)}$ (representing respectively "node u at time $\tau_0$" and "node v at time $\tau_1$" and an edge from $u^{(\tau_0)}$ to $v^{(\tau_1)}$. For simplicity, node $s^0$ represents source s at time 0, as well as nodes $T^{(\tau)} \triangleq \{t^{(\tau)}, \forall t \in T\}$ representing destinations T at time $\tau$.

The memory edges model the accumulation of information over time. After adding all transmission edges, for each node $u \in V$, the introduced vertices $\{u^{(\tau_i)}\}$ are connected along the time line. For example, if there are three nodes $u^{(\tau_0)}$, $u^{(\tau_1)}$, $u^{(\tau_2)}$ (with $\tau_0 < \tau_1 < \tau_2$) corresponding to u, then an infinity capacity edge is added from $u^{(\tau_0)}$ to $u^{(\tau_1)}$ and another infinity capacity edge from $u^{(\tau_1)}$ to $u^{(\tau_2)}$.

The trellis models the information flow in a packet network. For example, the throughput from the source to a receiver t at time $\tau$ cannot exceed the maximum flow from $s^{(0)}$ to $t_1^\tau$.

Assume that each node just outputs random linear mixtures of all its received packets. Therefore, when a node has received a packet belonging to generation i, it will start outputting mixture packets involving generation i. To make use of such packets, the system needs to solve for the packets in generation i. Using such mixture packets to decode generation i−1 may increase the decoding delay, referred to as the "inter-generation interference" (IGI) problem.

Figure 11:
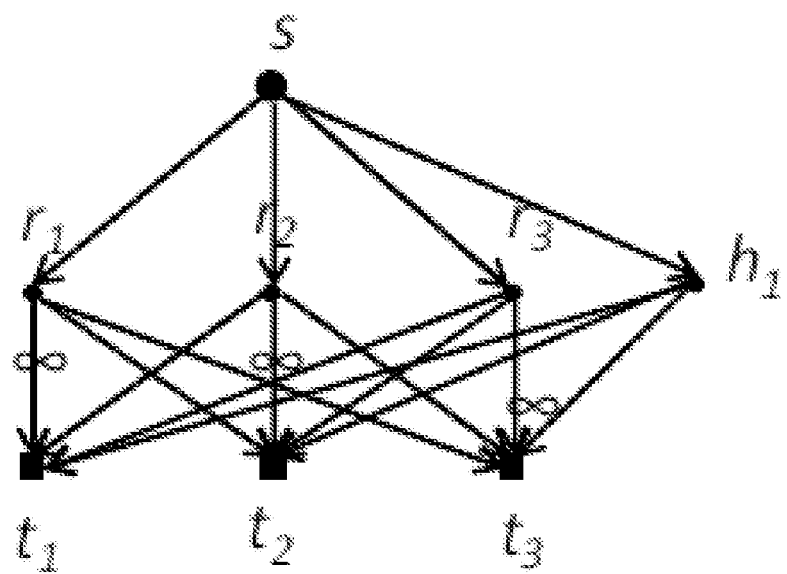
FIG. 11 is representation of a directed acyclic graph used to model latency-limited network coding throughput.

Turning to a simple model for latency-limited network coding throughput, the long-term achievable multicast throughput for network coding may be given by the minimum cut separating the source from a receiver. Due to the IGI problem, this throughput is generally not achievable. The technology described herein models the latency-limited network coding throughput as the minimum cut in a directed acyclic graph with two layers; the symbol D denotes such a graph, as illustrated in FIG. 11. In this example, there is a source node s, along with three receivers 1, 2, 3, and a helper node $h_1$ (which can be considered a "peer"). For each receiver i, there are two nodes, $r_i$ and $t_i$, in the graph; $t_i$ models the receiving functionality of node i and $r_i$ models the relaying functionality of node i.

Suppose that the prescribed link bit rates are given by the vector $c_m$, with the capacity for link ij being $c_{ij}^{(m)}$. Then in D, the link from s to $r_i$ has capacity $c_{si}^{(m)}$, the link from $r_i$ to $t_j$ (with i≠j) has capacity $c_{ij}^{(m)}$, and the link from $r_i$ to $t_i$ has infinite capacity. If the propagation delay of an edge ij exceeds the latency bound, it is not included it in the graph. If the propagation delay of a two-hop path s→i→j exceeds the latency bound, the edge from $r_i$ to $t_j$ is omitted from the graph. This ensures that every path in the graph has a propagation delay within the latency bound.

The latency-limited throughput $R_m(c_m)$ is modeled as the minimum cut separating the source node from a receiver node in D. This amounts to a conservative estimate of the achievable throughput. A subgradient $\partial R_m$ is computed by finding a critical cut in this graph, in a known manner.

Due to the structure of the graph D, the latency-limited throughput $R_m(c_m)$ has a closed-form expression:

$$R_m(c_m) = \min_i \sum_j \min\{c_{sj}^{(m)}, c_{ji}^{(m)}\} \qquad (12)$$

The min-cut capacity can still be achieved if edges entering receiver nodes only do forwarding. Applying the result to the graph D, it can be seen that the min-cut capacity can be achieved by packing trees. Network coding may be needed, however the system only needs to perform network coding at the source node.

The trees can be packed in polynomial time. In fact, the structure of the graph D allows the trees to be packed with a simple algorithm. To this end, suppose that the edges in the graph D have integer capacities. Each edge is represented with capacity m by m parallel edges, each with unit capacity. For each receiver node, e.g., i, compute the maximum number of edge-disjoint paths from s to $t_i$. Because of the graph structure, these edge-disjoint paths may be found with a relatively simple algorithm, without using max-flow algorithms. A path from s to $t_i$ needs to go through one of the intermediate nodes. Thus for each intermediate node, e.g., $r_j$, there may be found $\min\{c_{ai}^{(m)}, c_{ii}^{(m)}\}$ edge-disjoint paths from s to $r_i$ and then to $t_i$. For each edge $vt_i$ in these paths, its predecessor in these paths may be identified and assigned to be father($vt_i$). After doing this for all receivers, the trees are obtained from the father properties.

Therefore, trees can be packed at the source node, with the tree recorded in the header of each source-coded packet. Upon receiving each packet, the packet can be forwarded along each branch.

As a further improvement, a tree-clocked mixing strategy may be used. For each generation of content with the same deadline, trees are packed to ensure the source packets are sufficiently covered. The header of each source-coded packet has the tree and its deadline. Upon receiving each packet, one mixture packet is sent on each branch (mixing only contents of same or earlier deadlines, to avoid inter-generation interference by newer contents).

Exemplary Operating Environment

Figure 12:
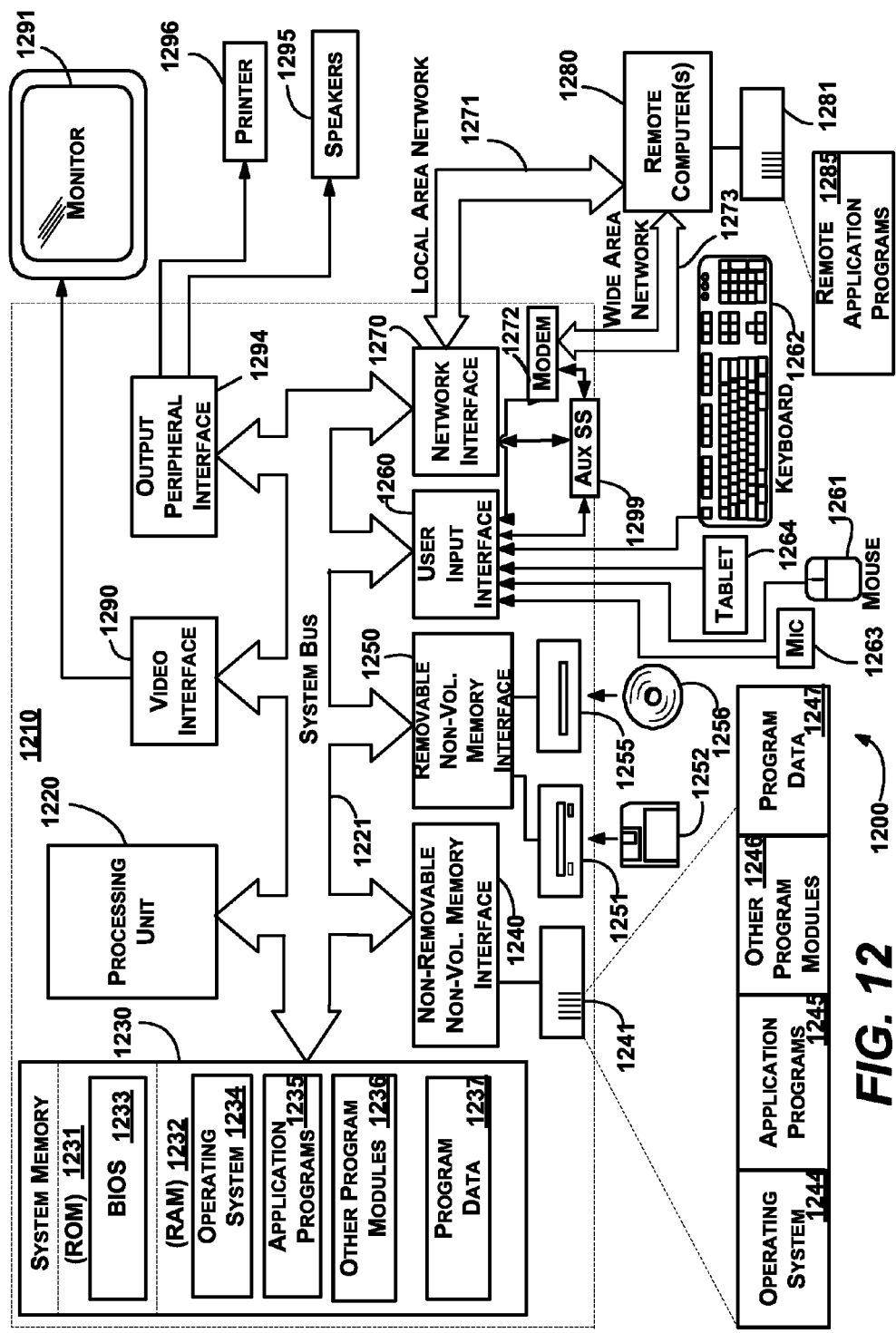
FIG. 12 shows an illustrative example of a computing environment into which various aspects of the present invention may be incorporated.

FIG. 12 illustrates an example of a suitable computing and networking environment 1200 on which the examples of FIGS. 1-11 may be implemented. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment 1200.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 12, an exemplary system for implementing various aspects of the invention may include a general purpose computing device in the form of a computer 1210. Components of the computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1210 typically includes a variety of computer-readable media. Computer-readable media can be any available media that can be accessed by the computer 1210 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1210. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236 and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media, described above and illustrated in FIG. 12, provide storage of computer-readable instructions, data structures, program modules and other data for the computer 1210. In FIG. 12, for example, hard disk drive 1241 is illustrated as storing operating system 1244, application programs 1245, other program modules 1246 and program data 1247. Note that these components can either be the same as or different from operating system 1234, application programs 1235, other program modules 1236, and program data 1237. Operating system 1244, application programs 1245, other program modules 1246, and program data 1247 are given different numbers herein to illustrate that, at a minimum, they are different copies. A user may enter commands and information into the computer 1210 through input devices such as a tablet, or electronic digitizer, 1264, a microphone 1263, a keyboard 1262 and pointing device 1261, commonly referred to as mouse, trackball or touch pad. Other input devices not shown in FIG. 12 may include a joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. The monitor 1291 may also be integrated with a touch-screen panel or the like. Note that the monitor and/or touch screen panel can be physically coupled to a housing in which the computing device 1210 is incorporated, such as in a tablet-type personal computer. In addition, computers such as the computing device 1210 may also include other peripheral output devices such as speakers 1295 and printer 1296, which may be connected through an output peripheral interface 1294 or the like.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include one or more local area networks (LAN) 1271 and one or more wide area networks (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260 or other appropriate mechanism. A wireless networking component such as comprising an interface and antenna may be coupled through a suitable device such as an access point or peer computer to a WAN or LAN. In a networked environment, program modules depicted relative to the computer 1210, or portions thereof, may be stored in the remote memory storage device. By way of example, and not limitation, FIG. 12 illustrates remote application programs 1285 as residing on memory device 1281. It may be appreciated that the network connections shown are exemplary and other means of establishing a communications link between the computers may be used.

An auxiliary subsystem 1299 (e.g., for auxiliary display of content) may be connected via the user interface 1260 to allow data such as program content, system status and event notifications to be provided to the user, even if the main portions of the computer system are in a low power state. The auxiliary subsystem 1299 may be connected to the modem 1272 and/or network interface 1270 to allow communication between these systems while the main processing unit 1220 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:
1. In a computing environment, a system comprising:
 a node that sends content to other nodes via packets comprising mixture packets and tree packets, the node including a data multicast engine that uses link rate information to determine a tree for transmitting the packets to the other nodes, the data multicast engine further configured to generate the mixture packets via network coding of at least two tree packets for transmitting to the other nodes, the node transmitting the tree packets to the other nodes for receipt and forwarding according to the tree, and periodically transmitting the mixture packets over at least one link to at least one other node, the mixture packets comprising information regarding the tree for use by the other nodes in forwarding the tree packets.

2. The system of claim 1 wherein the content comprises audiovisual data, and further comprising an audiovisual rate control module that determines a rate of sending the audiovisual data.

3. The system of claim 1 wherein the node further comprises a link rate control module that updates the link rate information based upon measured network conditions.

4. The system of claim 3 wherein the measured network conditions correspond to packet loss rate or delay measurements, or both packet loss rate and delay measurements.

5. The system of claim 4 wherein the link rate control module adapts to the measured network conditions by performing a centralized critical cut computation at a source node that sends the packets.

6. The system of claim 4 wherein the link rate control module adapts to the measured network conditions by performing a distributed critical cut computation at each node that receives the packets, and providing a report to each source node that sends the packets.

7. The system of claim 3 wherein the measured network conditions correspond to link innovation measurements, or session innovation measurements, or both link innovation measurements and session innovation measurements.

8. The system of claim 1 wherein the data multicast engine determines the tree by packing all possible candidate trees based upon the link rate information when the number of nodes is below a threshold number.

9. The system of claim 1 wherein the data multicast engine determines the tree by adding links one at a time based upon the link rate information when the number of nodes achieves a threshold number.

10. The system of claim 1 wherein the node includes means for reporting link rate information corresponding to incoming links to other nodes.

11. In a computing environment, a method performed on at least one processor, comprising:
using measured network conditions to adapt link rates of links between nodes;
determining a tree for delivering content to other nodes based upon the link rates; and
sending packets based on the tree, the packets comprising coded packets generated via network coding, the coded packets including information regarding the tree for use by other nodes in forwarding at least some of the packets, wherein determining the tree further comprises packing possible candidate trees based upon the link rate information when the number of nodes is below a threshold number, or by adding links one at a time based upon the link rate information when the number of nodes exceeds a threshold number.

12. The method of claim 11 wherein using the measured network conditions comprises performing a centralized critical cut computation at a source node that sends the packets.

13. The method of claim 11 further comprising receiving a report from each other node, and determining the measured network conditions from the report.

14. The method of claim 11 further comprising:
mixing a packet with another packet via a linear combination to provide a mixture packet, and sending the mixture packet to at least one other node.

15. The method of claim 14 further comprising, maintaining link innovation information corresponding to redundant packets and non-redundant packets received via a link, and using the link innovation information to obtain at least some of the measured network conditions.

16. The method of claim 14 further comprising, maintaining session innovation information corresponding to redundant packets and non-redundant packets received via a plurality of links for a session, and using the session innovation information to obtain at least some of the measured network conditions.

17. One or more computer-readable storage media having computer-executable instructions, which when executed perform steps, comprising:
computing link rate information based upon measured network conditions;
determining a tree for transmitting tree packets based upon the link rate information;
mixing packets into network coded packets for transmitting to other nodes;
transmitting the tree packets to other nodes for receipt and forwarding according to the tree, and transmitting the network coded packets over at least one link to at least one other node, the network coded packets comprising header information regarding the tree for use by other nodes in forwarding the tree packets; and
maintaining innovation information corresponding to redundant packets and non-redundant packets, the innovation information used in computing the link rate information.

18. The one or more computer-readable storage media of claim 17 wherein maintaining the innovation information comprises maintaining data corresponding to redundant packets and non-redundant packets received via a link.

19. The one or more computer-readable storage media of claim 17 wherein maintaining the innovation information comprises maintaining data corresponding to redundant packets and non-redundant packets received via a plurality of links for a session.

20. The one or more computer-readable storage media of claim 17 wherein determining the tree comprises packing possible candidate trees based upon the link rate information when the number of nodes is below a threshold number, or by adding links one at a time based upon the link rate information when the number of nodes exceeds a threshold number.

* * * * *